United States Patent
Smith et al.

[19]

[11] Patent Number: 5,931,877
[45] Date of Patent: Aug. 3, 1999

[54] ADVANCED MAINTENANCE SYSTEM FOR AIRCRAFT AND MILITARY WEAPONS

[75] Inventors: Colin A. Smith, Huntington Beach; James D. Uphold, West Hills; Robert C. Rassa, Granada Hills, all of Calif.

[73] Assignee: Raytheon Company, Lexington, Mass.

[21] Appl. No.: 08/655,652

[22] Filed: May 30, 1996

[51] Int. Cl.⁶ .................................................. G06F 19/00
[52] U.S. Cl. .............................................. 701/29; 701/30
[58] Field of Search ............................... 701/29, 30, 33, 701/34, 35

[56] References Cited

U.S. PATENT DOCUMENTS

| | | | |
|---|---|---|---|
| 4,404,639 | 9/1983 | McGuire et al. | 364/551 |
| 4,602,127 | 7/1986 | Neely et al. | 179/2 |
| 4,726,224 | 2/1988 | D'Ausillio | 73/167 |
| 4,989,146 | 1/1991 | Imajo | 364/424.04 |
| 5,111,402 | 5/1992 | Brooks et al. | 364/424.04 |
| 5,313,388 | 5/1994 | Cortis | 364/424.04 |
| 5,400,018 | 3/1995 | Scholl et al. | 340/825.54 |
| 5,442,553 | 8/1995 | Parrillo | 364/424.04 |
| 5,729,452 | 3/1998 | Smith et al. | 364/424.03 |
| 5,758,300 | 5/1998 | Abe | 701/33 |

*Primary Examiner*—William A. Cuchlinski, Jr.
*Assistant Examiner*—Arthur Donnelly
*Attorney, Agent, or Firm*—Leonard A. Alkov; Glenn H. Lenzen, Jr.

[57] ABSTRACT

An equipment maintenance system (10) comprising a central data storage warehouse (16) for electronically storing technical information and for providing on-line technical assistance for repairing the equipment. A data transceiver (12) transmits data to and receives data from the central data storage warehouse (16). A communications link (22, 26, 28, 30) between the central data storage warehouse (16) and the wireless data transceiver enables accessing of the technical information from the central data storage warehouse (16) by the data transceiver (12). Test means (40) identifies failed system components and minimizes occurrences of false BIT flags, unnecessary system maintenance and removal of operational system components. The maintenance system finds particular utility when implemented in conjunction with a fleet of transport vehicles, such as aircraft (14), or with military weapon systems (14).

22 Claims, 1 Drawing Sheet

ADVANCED MAINTENANCE SYSTEM FOR AIRCRAFT AND MILITARY WEAPONS

BACKGROUND OF THE INVENTION

1. Technical Field

The present invention relates generally to aircraft and military weapon maintenance and repair, and in particular to an advanced aircraft/weapon maintenance system that provides remote trouble-shooting and technical data access capabilities to technicians through a wireless link between a handheld point-of-maintenance transceiver and a central diagnostics center, thereby minimizing maintenance and repair time, costs and requisite paper reference materials.

2. Discussion

A large number of currently deployed military aircraft and weapons, such as the F-15E aircraft, were designed in the late 1970's and early 1980's with built-in test (BIT) logic that indicates to a system operator when a system component has failed or requires maintenance. This BIT logic which is typically designed into a system and implemented on a system level through both hardware and software, reports system failures or malfunctions due to failure of one or more system components which the logic is designed to detect. These failures or malfunctions are made known to the system operator, such as an F-15 pilot, on a cockpit display through a BIT flag identifying the specific failure or malfunction.

In operation, the system will generate significant amount of information for analysis by the BIT logic. The BIT logic then automatically performs a system-wide nodal analysis and can generate equipment maintenance orders usually signalled by generation of a BIT flag, based upon a combination of BIT data and system operator observations. Therefore, a component identified may be repaired or replaced before the aircraft or weapon fails or malfunctions on the front line.

However, conventional BIT logic often generates maintenance orders for components when the components are in fact fully operational. As a result, fully operational components will often be pulled and replaced. Therefore, overall weapon/aircraft maintenance costs are increased due to the performance of such unnecessary maintenance procedures. The removal of fully operational components also increases the number of aircraft or weapons temporarily out of commission and increases the number of maintenance technicians required to service the equipment.

In addition, once the BIT logic indicates that an aircraft or weapon requires repair and maintenance through generation of a BIT flag, technicians must be dispatched to the remotely located weapon, or intermediate hub repair points must be set up for servicing of these remotely located aircraft or weapons. Due to the ever increasing complexity of the electronics implemented in such systems, the technicians must exhibit a high level of training and have a high level of associated skill to repair the associated equipment. In addition, the technicians must have technical reference materials available to correctly locate and identify a flagged problem. For instance, it is estimated that the F-15 aircraft has an associated 16,000 pounds of associated technical data, paper reference materials, parts and repairs manuals, and other related reference materials. As updated technical data is published at regular periodic intervals, it is difficult at best for even the most highly skilled and trained technician to keep abreast of the most up-to-date information associated with each weapons system. Further, as such repair and component replacement must often be performed at locations remote from a central repair facility, the associated reference materials are often not readily available to the technicians when and where the materials are most needed. As is often the case, even updated reference materials are often months, or years, behind the most recently-implemented equipment.

One possible solution to the above referenced limitations includes retrofitting all weapons systems with the most current technically advanced BIT and diagnostics equipment. Such equipment would minimize false pulls of still operative weapon components and would greatly reduce time and expense associated with weapon repair and maintenance.

However, retrofitting weapons with this state-of-the-art technology is presently cost prohibitive and would require such systems to be removed from commission for a period of time while being retrofitted with the new equipment. In addition, such state-of-the-art technology would still require a significant amount of associated paper reference materials and would require technicians to maintain a high level of knowledge of the most current information on the equipment.

Therefore, it would be desirable to provide a maintenance system for such aircraft and military weapons systems that would minimize the number of false pulls of still operative system components. It would also be desirable to provide a maintenance system that would eliminate the need for intermediate, or hub, repair facilities implemented remotely from a central station and that would virtually eliminate the associated paper-based technical reference materials. This would minimize the associated time and cost and maximize accuracy and efficiency of system repair and maintenance operations.

SUMMARY OF THE INVENTION

In accordance with the teachings of the present invention, an advanced maintenance system is provided that utilizes existing system hardware and software, along with on-line technical expertise, to substantially enhance maintenance and repair of equipment such as aircraft and military weapons to reduce and/or eliminate removal of fully functional system components. The maintenance system of the present invention utilizes wireless transceivers or a combination of high speed land lines and wireless transceivers, in communication with a central data warehouse. These wireless transceivers eliminate the volumes of technical manuals and maintenance information typically associated with equipment repair facilities and reduce requisite parts inventories at repair depots. The maintenance system of the present invention also initiates and logs repair actions and work orders, thereby eliminating the need for paper tracking of repairs. The system also provides historical maintenance data for a particular aircraft or weapon. The maintenance system of the present invention thereby provides an information management solution to a problem that has characteristically been treated as hardware-based.

In particular, the present invention provides a maintenance system for remotely located equipment comprising a central data storage warehouse for electronically storing technical information and for providing on-line technical assistance for repairing the remotely located equipment. A data transceiver transmits data to and receives data from the central data storage subsystem. A communications link between the central data storage subsystem and the wireless data transceiver enables accessing of the technical information from the central data storage warehouse by the data transceiver. Also, test means is implemented to correctly identify failed system components, and thus minimize unnecessary pulls of operational equipment.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments is merely exemplary in nature and is in no way intended to limit the invention or its application or uses.

Figure 1:
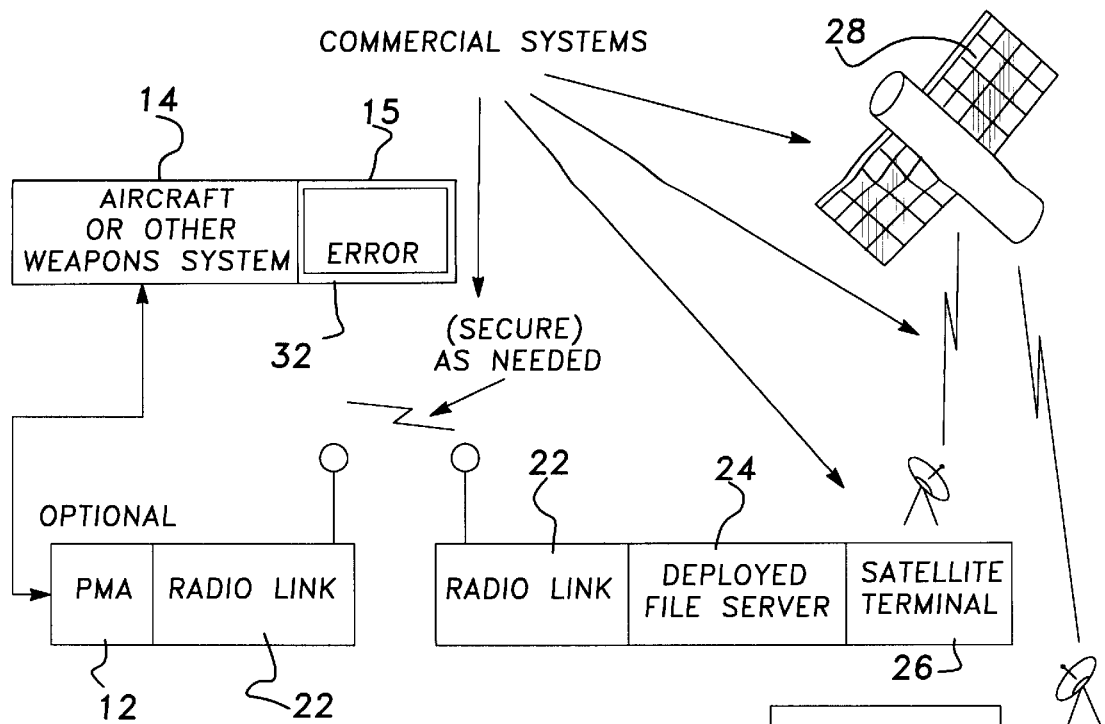
FIG. 1 illustrates an overall system diagram of the maintenance system according to a preferred embodiment of the present invention.

Referring to the drawings, FIG. 1 illustrates an aircraft/weapon maintenance system according to a preferred embodiment of the present invention generally at 10. The aircraft/weapon maintenance system of the present invention represents a new way of approaching the test and diagnostics of both aircraft, or other transport craft such as tanks or ships, and military weapons, starting at the system level or the serial numbered assembly and embracing all higher test levels. The weapon system of the present invention utilizes commercial, off-the-shelf hardware and information retrieval systems, existing technical and maintenance information, and a software-implemented enhancement for existing system-level BIT logic, integrated into a single system. The weapon system of the present invention achieves dramatic improvements in fault-detection and fault-isolation accuracy, with attendant reductions in false removals of fully functional components from aircraft, military weapons, or other systems requiring maintenance at locations remote from a central maintenance facility. These results enable substantial reductions in overall aircraft/weapon logistics footprints, reduce spare component requirements, and provide reduced depot (permanently installed facility dedicated to high volume repair of units, such as F-ISEs, requiring special engineering support and facilities) and (I-Level intermediate repair point deployable with forces at a permanent operating location) workloads.

The key components of the maintenance system of the present invention are shown in FIG. 1. A portable maintenance aid (PMA) 12 is provided for use by a repair technician. The PMA may be used along with conventional aircraft/weapon BIT logic, to remotely troubleshoot an aircraft/weapon 14, shown with an associated display 15, for component fault isolation. While reference will be made throughout to an aircraft or weapon, it should be understood that the system represented at 14 may also be any other type of system, such as tanks, ships, or other vehicles, requiring periodic maintenance or repair. The PMA or, optionally, a conventional desktop computer, also provides on-line access of a central data warehouse 16 for real-time communications and transmittal of technical information and data, plus initialization and population of repair/work orders.

The central data warehouse includes a technical information database 18 that maintains electronic technical order and technical manual libraries, and a master maintenance history database 20 for all weapons entered into the system. The PMA 12 communicates with the central data warehouse 16 through a radio link 22, which maybe a local area network operating at an FM ground net frequency, or any other similar radio link such as those commercially available from companies such as Proxin and Cylink. The radio link is in operative communication with both a deployed file server 24 and a satellite terminal 26. The satellite terminal bi-directionally relays radio signals transmitted across the radio link to a satellite system 28. The satellite system 28 in turn relays the signals to a satellite broadcast station 30 operatively associated with the central data warehouse 16. Each of the above components will be described in more detail below.

The PMA 12 is a key element of the maintenance system of the present invention, as it delivers critical maintenance-related data in real time to and from the point of use. The PMA is preferably a commercially available hand-held computer such as the units manufactured by Paravant Computer Systems, Allied Signal Aerospace, computing Devices International and SAIC. The PMA preferably has a nominal weight of 5 to 7 pounds, and includes the associated radio link 22. The PMA is capable of providing a technician with maintenance procedures, illustrations and parts lists downloaded in real time from the central data warehouse 16 to aid the technician in repair/maintenance work and eliminate paper reference materials. Additionally, the PMA of the present invention automatically generates a network repair order subsequent to isolation of the problem at the aircraft or weapon.

The PMA 12 is implemented to provide automated download of BIT data from an aircraft or weapon bus if the weapon or aircraft is appropriately configured. For example, in the U.S. Department Of Defense environment, a convenient means to extract a significant amount of BIT and related aircraft performance parameters presently exists on aircraft such as the F-15, F-18, and F-16. A Data Transfer Module (DTM) or Data Transfer cartridge (DTC) exists on these aircraft to record test and performance parameters during each aircraft sortie or mission. The DTM or DTC may be removed from the aircraft and downloaded off-line (on the F-15 and F-18 this is known as a Computerized Fault Reporting System or CFRS) during the official pilot debrief. Similarly, on aircraft such as the Boeing 777, there are 5 access ports to the aircraft bus are present for downloading of BIT-related information to the PMA. The maintenance system 10 of the present invention can automate this process and provide direct interface to the central data warehouse 16.

The base file server 24 is a control and interface unit for storing data requested by the PMA and the central data warehouse. The file server also functions as a data re-entry point for repopulation of new data at the maintenance database 16. Blocks of information may also be downloaded to the file server for local non-real-time access as needed. The file server 24 is hooked to the commercial satellite terminal 26. The satellite terminal 26 enables real-time communication via satellite between the PMA 12 and the central data warehouse 16.

The satellite system 28 is of the type that is commercially available and which utilizes low-cost, commercial ground stations incorporating Very Small Aperture Terminals (VSAT) with 1 to 2 meter antennas, such as the satellite terminal 26. The system 28 provides the system 10 of the present invention with real-time, on-line satellite communications capability. Thus, one main operating terminal located at the data warehouse 16 or at the file server 24 and utilized for each maintenance activity can communicate with a plurality of PMAs in use via the FM ground net radio link 22. Requests for relevant portions of current technical orders or technical manuals for the particular aircraft or weapon under analysis are made by a technician at the PMA 12 through the VSAT, which preferably has a narrow-band (128 Kbytes/sec) uplink capability. The request is then downloaded via wideband downlink (512 kb/sec) to the central data warehouse 16. It is contemplated that these data rates will increase as the associated technology matures. This download eliminates the need to distribute and control the electronic format. In a non-maintenance environment, such as status tracking, trend analysis, etc., PC-based terminals may also be interconnected to the satellite system to provide real-time communications capability to the central data warehouse.

The satellites that are planned for use are extremely reliable and multiple redundant. Typically these satellites operate on either Ku-band or C-Band frequency. Such satellites are typically in constant use for a variety of commercial applications. Therefore, there is no associated loss of service or data integrity when the system of the present invention is implemented using the satellites. Communications channel space may be procured on an average-demand basis if the system of the present invention is implemented in a commercial application. There is substantial bandwidth available, as communications satellites are multi-channel, multi-transponder systems.

Satellites such as those owned by Hughes Electronics, assignee of the present invention, provide full coverage for the United States and Europe, and Hughes business partners, including TRW, General Electric, Hughes-Olivetti, IMPSAT, and numerous others provide essentially the remainder of full global coverage. Longer distances may require the use of more than one satellite; however, this requirement is transparent to the user. Nominal satellite delays of approximately 250–500 milliseconds may be associated with system transmissions.

It should also be appreciated that high speed land lines, such as co-axial, telephonic twisted pair, electro-optic cable, or other similar lines could also be used exclusively, or in combination with, satellite lines to supplement the present invention.

Reference will now be made to the central data warehouse 16. Instructions from the central data warehouse 16 are provided via the satellite system 28 directly to the technician performing tests on the aircraft or weapon 14, along with illustrations and other pertinent information. Expert help from experienced technicians is also available at the central data warehouse facility. Since one location serves all users, it is conceivable that a 24-hour staff of experts in each aircraft or weapon system be available full time to assist in resolving difficult maintenance problems.

The interactive electronic technical manual (IETM) and library database 18 is implemented at the central data warehouse 16. This IETM library database may be accessed by PMAs in remote operating locations via the radio link 22 and satellite system 28. The technical library is created from any source documentation, technical manuals, Logistics Support Analysis Record (LSAR), parts illustration, or like record. Upon receiving a request for information from a particular technical manual, the central data warehouse 16 automatically pulls the correct repair procedure, including all recent revisions, based upon the transmitted symptoms and diagnosed fault at the aircraft or weapon 14. This information is then sent to the requesting PMA. Subsequently, the PMA displays correct diagrams/chromatics/part listings and interchangeability to the technician. In addition, the technical manual database 18 may direct a guided probe and perform additional tests and observations in order to unambiguously isolate the fault occurring at the aircraft or weapon. Such an electronic technical manual database thereby eliminates the need to distribute paper or CD ROM copies of any technical orders or manuals to field technicians and eliminates the need for on-site configuration management of these operating manuals. It should also be appreciated that the central data warehouse 16 will also accommodate standard technical manuals in raster or vector scan format.

Additionally, information contained in the real-time technical manual and IETM library database 18 is automatically provided to the technician. The central data warehouse 16 contains all technical order information in either IETM or raster/vector format, in the technical database 18. Instead of distributing a full set of technical orders or technical manuals to intermediate hubs located near deployed aircraft and/or weapons where maintenance is performed, technical order/technical maintenance manual (TO/TM) data is maintained only at the central data warehouse, which is implemented via distributed database methodology, and downloaded only upon demand to the PMA. This eliminates the need to continuously update, print, distribute, and maintain paper copies of TO/TMs, and the need to cross-reference by Serial Number (SERNO) and configuration break-in-point.

As soon as a TO/TM change is approved, it is immediately available to all field technicians. Maintenance procedures, illustrations from an illustrated parts breakdown reference, parts listings, interchangeability data, and provision-type data are all available real-time, on-line, to the technician at the flight line or the point of maintenance. Alternatively, the information may be downloaded periodically to an intermediate database, such as the file server 24, which in turn functions as the point of access for the PMA 12.

Referring now to the maintenance database 20, having available the most recent, as well as historical, maintenance data at the maintenance database for the weapon or aircraft being repaired is also extremely useful. Troublesome component malfunction signals can as a result be examined in far greater detail when the system generates a BIT flag, shown at 32 on the operator display 15, in response thereto. In general, this BIT flag may be any type of indicator that represents a problem identified by system BIT logic. For example, if a component often exhibits erroneous fault symptoms when installed in a particular aircraft or weapon, such information is provided to the technician. The maintenance database is tied in to all levels of maintenance, and is populated in real-time by each repair activity as maintenance actions are initiated and completed. This feature allows real-time analysis of reliability and maintainability factors on a weapon by weapon or aircraft by aircraft basis. At higher levels of repair, the logged maintenance actions are already present upon arrival of a suspected faulty component. As soon as repairs to the unit are complete, this maintenance action is immediately available throughout the entire system.

The maintenance database 20 also logs and tracks all maintenance actions, thereby eliminating the need for paper forms to document maintenance actions. Work/repair orders are opened at the point of use, data is entered by the technician using the PMA. This information is available to all users instantaneously. The maintenance history of an aircraft or weapon is updated automatically. At higher levels of repair such as intermediate hub depots, the data is entered into the system via standard PC-based terminals. Real-time trend analysis is also performed by the system, as well as continuous tracking by serial number of every repairable component in the system. It is contemplated that custom sub-routines may also be implemented to extract visibility data for management and budgeting purposes.

It should be appreciated at this point that the aircraft/ weapon maintenance system of the present invention is extremely flexible and modular in implementation. An initial system can be configured to deliver paperless technical manuals to desk-top PC-based terminals on demand. Such a paperless system eliminates the extraordinary delay in printing, distributing and disseminating technical manuals once the manuals have been approved for use. The manuals are merely loaded into the system and are immediately available world-wide to all users. Maintenance data tracking can be added at a later time.

Through the above-mentioned fault identification capabilities of the central data warehouse 16, technicians may be directed to test only failed components, thereby avoiding the need to spend more time consuming and thus more costly, overall system tests.

The aircraft/weapon maintenance system 10 of the present invention also includes an optional feature BIT modeling logic, referred to as virtual testability, that is capable of substantially enhancing the diagnosis of failed weapon system components. For purposes of discussion, the virtual testability logic will be described as it is implemented in conjunction with an F-15 radar system. However, it is contemplated that this logic may be implemented in other environments in which the maintenance system of the present invention is implemented. The logic incorporates the logic of several different tests that, when implemented with the on-board diagnostics of the weapon or aircraft 14, provide a high degree of success in minimizing removal of still-operational system components. The virtual testability logic thoroughly analyzes existing data and may be implemented with little or no changes to existing aircraft system hardware. The virtual testability logic utilizes a nodal analysis to map performance-related parameters, along with existing test access, to provide a more comprehensive assessment of performance than would normally be accomplished by the existing BIT logic alone.

Figure 2:
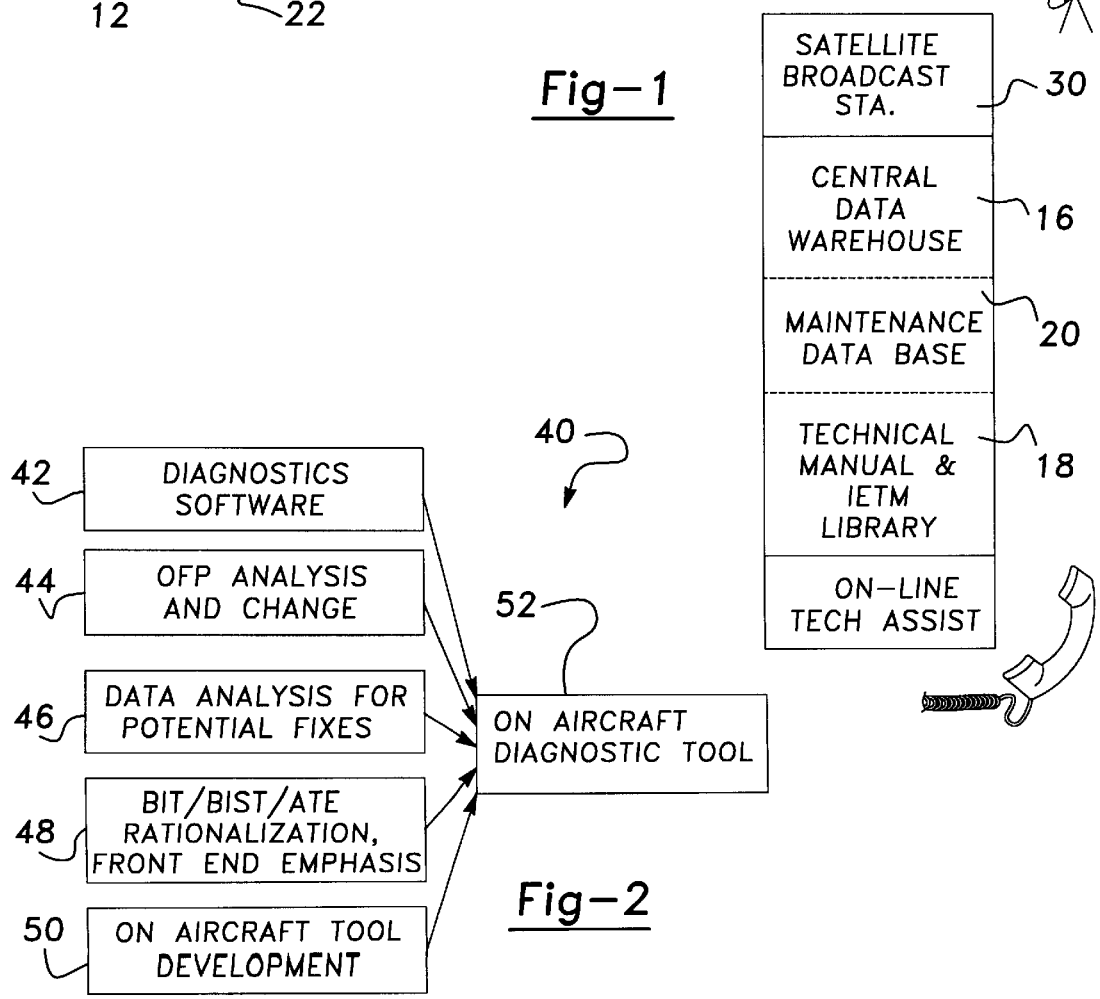
FIG. 2 illustrates in block diagram form several hardware and software implemented test programs that, when implemented with an aircraft/weapon on board diagnostics tool, reduce the number of false pulls of operational equipment.

Referring in particular to FIG. 2, test blocks representing several sequences of virtual testability logic implemented in conjunction with an F-15 radar system are shown generally at 40. A commercially available analytical program, known as Diagnostician and owned by Giordano Automation, Inc. of Sparta, N.J., is shown at block 42. The Diagnostician program utilizes a mapped diagnostic knowledge base and an artificial intelligence inference engine, mapped into aircraft tactical software, such as the operational flight program in the F-15. Other modeling techniques for BIT mapping are available and equally applicable.

In addition to the inference engine and its associated knowledge base, the Diagnostician program also includes several engineering tools having the capability of providing a technician with statistical reports on the quality of the data being accumulated by the knowledge base. There is virtually no limit to the size of the test database on which the Diagnostician can operate. Therefore, it can be utilized vertically at any of the well-known tactical, organizational, intermediate, depot and manufacturing levels of test to provide automatic component fault isolation. The quality of fault isolation is a direct function of the quantity and quality of available diagnostics information and system design detail.

Also, Diagnostician-generated test data can be input to its knowledge base. By applying this program to the maintenance system of the present invention, the knowledge base of the Diagnostician program is enriched at each inquiry through its access to the current worldwide histogram of similar fault frequencies across the entire fleet of operational aircraft.

Referring to test block 44, an Operational Flight Complex (OFP) program is shown. Complex avionics are generally software controlled via an OFP running in one or more imbedded or external processors. Radar OFPs are extremely complex and inevitably contain bugs such as algorithmic or coding errors. These bugs can be caused by errors in the software or by artifacts that, under certain inflight circumstances, can drive the hardware into an unknown state, thus setting a BIT component failure flag. The phenomena can occur often, rarely, or not manifest itself for years until age has caused a hardware performance decrease.

When set, a BIT flag, such as that shown at 32 in FIG. 1, causes a maintenance action to take place. If the technician can not verify the cause of the BIT indicated failure at the plane, he must remove the most probable faulty component, or line replaceable unit (LRU), for further testing and repair in a forward area intermediate shop or at a rear echelon depot repair facility. The reason for the BIT indication may be duplicated and repaired at those facilities. However, typically around 50% of such failures are not duplicated when so tested. The OFP applies current knowledge and advanced analytical tools to identify, remove or operate around the cause of this class of BIT failure indications.

With reference to test block 46, there have been several attempts to alleviate false LRU pull problems through analysis of voluminous existing maintenance data for patterns, ancillary symptoms, or other existing but unrecognized diagnostic clues. Some success has been achieved, but a system level analysis has not been accomplished in most cases. Indications are that such an analysis would contribute significantly to the overall solution being pursued. The data analysis approach of block 46 would collate previous analytical efforts, identify the parameters of success so achieved, and do a system level analysis of other such parameters that contribute to the overall virtual testability concept.

Reference is now made to test block 48. In the current repair cycle, BIT and built in self tests (BIST) identify a failure and generate a BIT flag. Depending on the specific aircraft and sophistication of the application, some diagnostic action must take place before a repair is made. Generally, this diagnostic activity is performed using automated test equipment (ATE) at the aircraft itself, in an intermediate shop, or at the depot repair facility. At each level, the ATE is significantly different, having been built for field deployability or permanent residence in a depot. The tests applied are different as well. These different test routines yield inconsistent results.

As it is not cost effective to replace all the various ATE for a weapons system, through careful analysis, the most costly problem areas can be identified and made more consistent with each other. Utilization of the same or almost the same detailed test and trouble shooting techniques across the repair cycle eliminates another portion of the problem of trying to duplicate component errors occurring in the field during repair operations.

Reference is now made to test block 50. Current BIT/ BIST and on-aircraft ATE does not use all information available to perform an accurate diagnosis. For example, radar systems have test ports that give access to bus 10 traffic and other information used in manufacturing check out and initial integration. On board maintenance recorders may be enhanced to record more or more pertinent inflight data. Radar sets constantly calibrate internally; this data often highlights component failure but is not currently used in diagnostic processes. Implementation of test block 50 to access the above data, coupled with advanced analytical programs, provides additional improvement of the maintenance system of the present invention.

When the above test sequences indicated in blocks 42–50 are integrated to form the virtual testability logic, the tests, in combination with the on-aircraft diagnostics tools represented in test block 52, substantially reduce the false removal rate of operational system components.

At this point it should be appreciated that the virtual testability logic is an optional feature of the maintenance system which enhances BIT logic accuracy. However, the remaining portions of the maintenance system of the present invention are fully functional apart from the new logic. It should also be appreciated that the virtual testability logic described above may be applied to any system requiring regular repair and testing of components.

It should also be appreciated that data to be uploaded or downloaded through the maintenance system of the present invention can also be encrypted in situations where access to the data or contamination thereof has to be rigorously avoided. Standard encryption methods such as now used in long-distance communications are employed in such cases.

An alternate operating scenario also exists where a user may not desire to radiate or transmit during certain periods. In this circumstance, the block of technical manuals and/or maintenance data history for the aircraft or weapons to be maintained can be downloaded in bulk to the deployed file server, which can then be set up for autonomous operation in stand-alone mode with a plurality of PMAs. Once the blackout period has ended, maintenance information from opened work/repair orders is uploaded to the central database.

As is evident from the foregoing description, the weapon maintenance system of the present invention greatly simplifies the job of the technician. All pertinent test/trouble shooting/maintenance information is available immediately at the flight line, allowing all suspect faults and squawks to be accurately and efficiently resolved. Excess use of spare components due to false removals is nearly eliminated, maintenance times are significantly reduced, TO distribution/configuration control/update problems are eliminated, and maintenance data analysis is provided automatically, in real-time.

It should be appreciated at this point that the weapon maintenance system of the present invention reduces overall maintenance costs in several areas. First, overall systems cost is reduced through the minimizing of the number of spare components required to be kept in inventory, as the maintenance system of the present invention requires use of spare parts only when the parts or components are truly needed. Second, the system of the present invention provides ease of configuration management in that only one copy of Test Program Set (TPS) and one copy of TO must be maintained in the central data warehouse. No field Time Compliance Technical Orders (TCTOs) need be distributed in the current paper-based format. Third, the system of the present invention eliminates the need for warehouses to store technical orders and manuals, as the need for paper maintenance forms is eliminated. Fourth, the system of the present invention improves the accuracy of aircraft/weapon repair and maintenance and reduces the skill level, experience level and number of technicians required for accurate and effective aircraft/weapon maintenance and repair.

It is also contemplated that the system 10 according to the present invention may be utilized for information storage and retrieval in connection with other systems requiring remote access to any large amount of data in real-time. Such systems include large commercial enterprises, such as trucking companies, automotive repair activities, and retail establishments or any other technical endeavor requiring technician or engineering access to a large and constantly updated information database where there is extensive field maintenance required or where on-line expertise, a centralized data reference database for technical manuals or product or component configuration history is stored and in which satellite-based communications networks can be implemented to reduce overall system cost.

Various other advantages of the present invention will become apparent to those skilled in the art after having the benefit of studying the foregoing text and drawings, taken in conjunction with the following claims.

What is claimed is:

1. An equipment maintenance system comprising:
   a central data warehouse for electronically storing technical and historical equipment data;
   a data transceiver for communicating with said central data warehouse;
   a communications link between said central data warehouse and said data transceiver for linking said central data warehouse and said data transceiver; and
   test means for testing equipment components, said test means identifying failed equipment components and minimizing removal of operational equipment components.

2. The system of claim 1, wherein said test means comprises diagnostics means implemented at said data transceiver and said central data warehouse for identifying faulty equipment components and increasing equipment component fault identification accuracy.

3. The system of claim 1, wherein said system provides equipment repair and maintenance information to said data transceiver in real-time.

4. The system of claim 1, further comprising an intermediate data hub, said technical equipment data from said central data warehouse being downloaded to said intermediate data hub for subsequent retrieval by said data transceiver.

5. The system of claim 1, wherein said test means is implemented at said data transceiver.

6. The system of claim 1, wherein said test means comprises diagnostics means implemented at said central data warehouse for supplying test parameters to said data transceiver for testing said equipment components.

7. The system of claim 1, further comprising a file server for storing said data requested by said central data warehouse and said data transceiver prior to said data being transmitted by said communications link.

8. The system of claim 1, wherein said communications link comprises a wireless data communications link.

9. The system of claim 1, further comprising diagnostics means initiated by said test means to effect transmission of said data between said data transceiver and said central data warehouse for equipment trouble shooting and equipment maintenance purposes.

10. The system of claim 1, wherein said communications link comprises a first wireless transmitter implemented at said data transceiver, a second wireless transmitter implemented at said central data warehouse, and a satellite system linking said first and second transmitters.

11. The system of claim 1, wherein said central data warehouse further provides technical assistance to an operator of said data transceiver.

12. The system of claim 1, wherein said test means causes said technical equipment data to be downloaded to said data transceiver in a problem-specific format.

13. A transport craft maintenance system, comprising:
  a central data warehouse, including electronically stored transport craft technical and maintenance data, said central data warehouse further providing on-line transport craft maintenance technical assistance;
  a remote transceiver for transmitting data requests to said central data warehouse and for receiving said transport craft technical and maintenance data from said central data warehouse in response to said data requests;
  a communications link between said central data warehouse and said remote transceiver; and
  test means for identifying transport craft components requiring maintenance, said test means minimizing generation of false BIT flags to minimize removal of operational transport craft components identified by said false BIT flags.

14. The system of claim 13, wherein said test means comprises a plurality of individual software-based test programs integrated into a single test unit.

15. The system of claim 13, further comprising a file server for storing data requested by said central data warehouse and said remote transceiver before said data is transmitted across said communications link.

16. The system of claim 13, wherein said communications link comprises a radio link between said remote transceiver and said central data warehouse in communication with a satellite communications system.

17. An aircraft system, comprising:
  an aircraft;
  a central data warehouse located remotely from said aircraft including an electronic technical information database providing updated technical maintenance information on aircraft components, said central data warehouse further including a maintenance database for tracking historical maintenance data for said aircraft components, said central data warehouse further including technical support means for providing on-line technical assistance;
  a remote wireless transceiver for transmitting data to and receiving data from said central data warehouse relating to maintenance of said aircraft;
  a communications link between said central data warehouse and said wireless data transceiver for effecting transmission of data between said central data warehouse and said remote transceiver;
  test means for generating a BIT flag to identify failure of one or more of said aircraft components; and
  diagnostics means initiated in response to said BIT flag generated by said test means for trouble shooting said aircraft components.

18. A military weapon maintenance system, comprising:
  a central data warehouse including electronically stored military weapon technical and maintenance data, said central data warehouse further providing on-line military weapon maintenance technical assistance;
  a remote transceiver for transmitting data requests to said central data warehouse and for receiving said military weapon technical and maintenance data from said central data warehouse in response to said data requests;
  a communications link between said central data warehouse and said remote data transceiver; and
  test means for identifying military weapon components requiring maintenance, said test means minimizing generation of false BIT flags to minimize removal of operational military weapon components identified by said false BIT flags.

19. The system of claim 18, wherein said test means comprises a plurality of individual software-based test programs integrated into a single test unit.

20. The system of claim 18, further comprising a file server for storing data requested by said central data warehouse and said remote transceiver before said data is transmitted across said communications link.

21. The system of claim 18, wherein said communications link comprises a radio link between said remote transceiver and said central data warehouse in communication with a satellite communications system.

22. A military weapon system, comprising:
  a military weapon;
  a central data warehouse located remotely from said military weapon including an electronic technical information database providing updated technical maintenance information on military weapon components, said central data warehouse further including a maintenance database for tracking historical maintenance data for said military weapon components, said central data warehouse further including technical support means for providing on-line technical assistance;
  a remote wireless transceiver for transmitting data to and receiving data from said central data warehouse relating to maintenance of said military weapon;
  a communications link between said central data warehouse and said wireless data transceiver for effecting transmission of data between said central data warehouse and said remote transceiver;
  test means for generating a BIT flag to identify failure of one or more of said military weapon components; and
  diagnostics means initiated in response to said BIT flag generated by said test means for trouble shooting said military weapon components.

* * * * *